(12) United States Patent
Theis et al.

(10) Patent No.: US 12,485,138 B2
(45) Date of Patent: Dec. 2, 2025

(54) PROPHYLACTIC USE OF INULIN AGAINST SINUSITIS

(71) Applicant: SÜDZUCKER AG, Mannheim (DE)

(72) Inventors: Stephan Theis, Deidesheim (DE); Carolin Sieland, Krauthausen (DE)

(73) Assignee: SÜDZUCKER AG, Mannheim (DE)

(*) Notice: Subject to any disclaimer, the term of this patent is extended or adjusted under 35 U.S.C. 154(b) by 134 days.

(21) Appl. No.: 17/315,436

(22) Filed: May 10, 2021

(65) Prior Publication Data

US 2021/0322459 A1 Oct. 21, 2021

Related U.S. Application Data

(63) Continuation of application No. 15/737,776, filed as application No. PCT/EP2016/068441 on Aug. 2, 2016, now abandoned.

(30) Foreign Application Priority Data

Aug. 4, 2015 (EP) .................................... 15179726

(51) Int. Cl.
*A61K 31/733* (2006.01)
*A23L 29/244* (2016.01)
*A23L 33/10* (2016.01)
*C08B 37/00* (2006.01)

(52) U.S. Cl.
CPC .......... *A61K 31/733* (2013.01); *A23L 29/244* (2016.08); *A23L 33/10* (2016.08); *C08B 37/0054* (2013.01); *A23V 2002/00* (2013.01)

(58) Field of Classification Search
CPC ...... C08B 37/0054; A61P 11/02; A61P 11/12; A61P 31/00; A61K 31/733; A61K 31/702
See application file for complete search history.

(56) References Cited

U.S. PATENT DOCUMENTS

| | | | |
|---|---|---|---|
| 7,812,004 B2 | 10/2010 | Frippiat et al. | |
| 8,277,835 B2 | 10/2012 | Boehm et al. | |
| 9,566,291 B2 | 2/2017 | Boehm et al. | |
| 9,763,465 B2 * | 9/2017 | Sprenger | A23L 33/18 |
| 10,335,430 B2 | 7/2019 | Frippiat et al. | |
| 2003/0068429 A1 | 4/2003 | Frippiat et al. | |
| 2007/0042992 A1 | 2/2007 | Frippiat et al. | |
| 2007/0274983 A1 | 11/2007 | Kluijtmans et al. | |
| 2008/0124323 A1 | 5/2008 | Boehm et al. | |
| 2010/0233129 A1 | 9/2010 | Fichot et al. | |
| 2010/0261671 A1 | 10/2010 | Frippiat et al. | |
| 2013/0102560 A1 | 4/2013 | Boehm et al. | |
| 2013/0131014 A1 | 5/2013 | Fichot et al. | |
| 2014/0296179 A1 | 10/2014 | Boehm et al. | |

FOREIGN PATENT DOCUMENTS

| | | |
|---|---|---|
| CN | 1400869 | 3/2003 |
| CN | 1221182 | 10/2005 |
| CN | 101094687 | 12/2007 |
| CN | 101909615 | 12/2010 |
| CN | 101043904 | 4/2012 |
| EP | 1 125 507 A1 | 8/2001 |
| EP | 1 629 850 A1 | 3/2006 |
| EP | 1 259 125 | 4/2006 |
| EP | 2 060 257 A1 | 5/2009 |
| EP | 2 851 090 | 3/2015 |
| EP | 2 217 230 | 2/2018 |
| WO | 95/01849 | 1/1996 |
| WO | 95/05793 | 2/1998 |
| WO | 2006/022543 | 3/2006 |

OTHER PUBLICATIONS

Veereman, Gigi, The Journal of Nutrition, "Pediatric Applications of Inulin and Oligofructose", 2007, vol. 137, pp. 2585S-2589S (Year: 2007).*

Lohner, Szimonetta et al., Nutrition Reviews, "Prebiotics in healthy infants and children for prevention of acute infectious diseases: a systematic review and meta-analysis", 2014, vol. 72, No. 8, pp. 523-531 (Year: 2014).*

Lohner, Szimonetta et al., The Journal of Nutrition, "Inulin-Type Fructan Supplementation of 3- to 6-Year-Old Children is Associated with Higher Fecal Bifidobacterium Concentrations and Fewer Febrile Episodes Requiring Medical Attention", 2018, vol. 148, pp. 1300-1308 (Year: 2018).*

International Search Report dated Sep. 26, 2016 for corresponding International Application No. PCT/EP2016/068441.

Written Opinion dated Sep. 26, 2016 for corresponding International Application No. PCT/EP2016/068441.

Bruzzese et al., "A formula containing galacto- and fructo-oligosaccharides prevents intestinal and extra-intestinal fections: An observational study", Clinical Nutrition, 28, 2009, pp. 156-161, doi:10.016/j.clnu.2009.01.008.

(Continued)

*Primary Examiner* — Bahar Craigo
(74) *Attorney, Agent, or Firm* — Sheppard Mullin Richter & Hampton LLP

(57) ABSTRACT

The present invention relates to an inulin composition comprising $GF_n$- and $F_m$-compounds, in particular for decreasing the risk of sinusitis, preferably for use in the prophylaxis of sinusitis in a subject in need thereof and food, beverages and pharmaceutical compositions containing the inulin composition.

11 Claims, 2 Drawing Sheets

(56) References Cited

OTHER PUBLICATIONS

Figure 1:
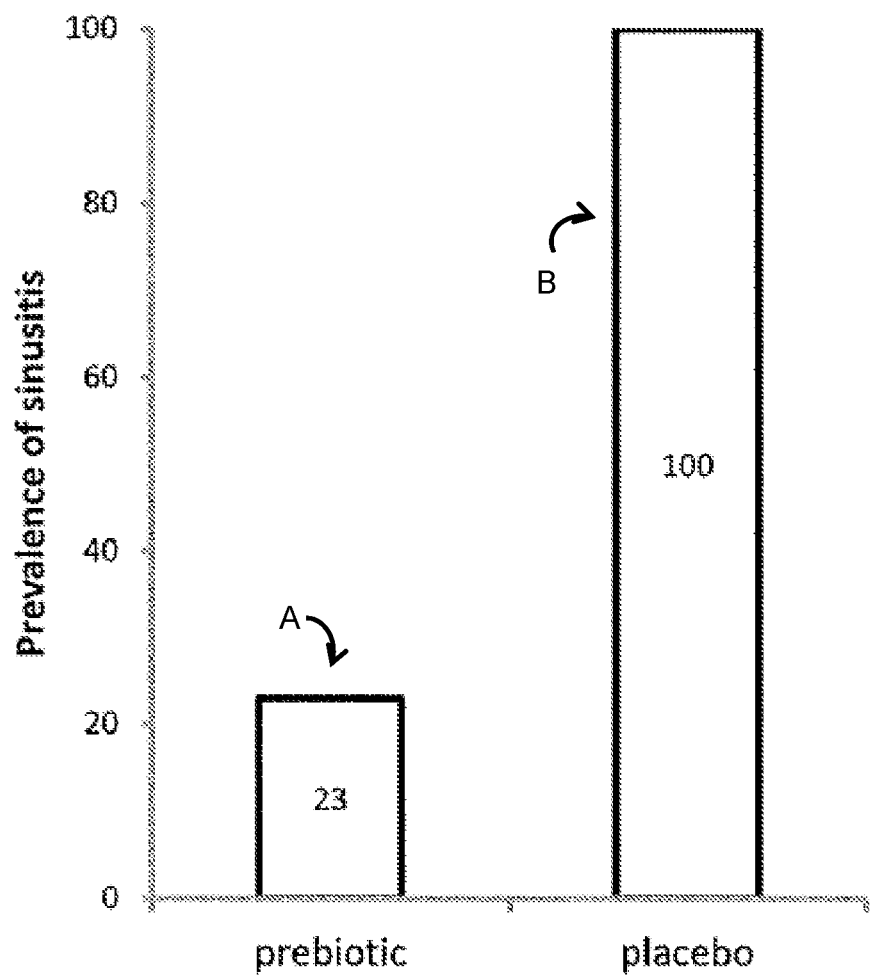

Gigi Veereman, Pediatric Applications of Inulin and Oligofructose1-3, The Journal of Nutrition, 2007, pp. 2585S-2589S; downloaded on Jun. 25, 2020 from hllps://academic.oup.com/jn/article-abstracl/137/11/2585S/4664511.

Veereman-Wauters et al., "Physiological and Bifidogenic Effects of Prebiotic Supplements in Infant Formulae", JPGN, vol. 52, No. 6, Jun. 2011.

U.S. National Library of Medicine, Clinical Trials.gov Identifier: NCT03241355, "Prebiotic Fructans on the Incidence of Acute Infectious Diseases in Children", Aug. 7, 2017.

Moro et al., "A mixture of prebiotic oligosaccharides reduces the incidence of atopic dermatitis during the first six months of age", Arch Dis Child, 2006, 91: pp. 814-819, doi:10.1136/adc.2006.098251.

Luoto et al., "Prebiotic and probiotic supplementation prevents rhinovirus infections in preterm infants: A randomized placebo-controlled trial", J. Allergy Clin Immunol, Feb. 2014, pp. 405-413.

U.S. National Library of Medicine, Clinical Trials.gov Identifier: NCT00808756, "Study on Fermentable Carbohydrates In Healthy Infants (BAMBINOL)", Dec. 16, 2008.

Arslanoglu et al., "Early Dietary Intervention with a Mixture of Prebiotic Oligosaccharides Reduces the Incidence of Allergic Manifestations and Infections during the First Two Years of Life 1,2", The Journal of Nutrition, 2008, pp. 1091-1095, downloaded on Jul. 3, 2020 from https://academic.oup.com/jn/article-abstracl/138/6/1091/4670260.

Lohner et al., "Inulin-Type Fructan Supplementation of 3- to 6-Year Old Children is Associated with Higher Fecal Bifidobacterium Concentrations and Fewer Febrile Episodes Requiring Medical Attention", The Journal of Nutrition, Jul. 3, 2018, pp. 1300-1308.

Drafti®HP, Product Sheet, DOC.A4-05/002, Orafti®HP, 1/4, beneo, including Specification.

Drafti®L85, Product Sheet, DOC.A3-02/003, Orafti®L85, 1/4, beneo, including Specification.

Drafti®Synergy1, Product Sheet, DOC.A3-40*10/11, beneo, including Specification.

Gibson et al., "Prebiotics: Development & Application", Publisher: John Wiley & Sons, Ltd. 2006, Chapter 3.3-3.7, pp. 59-61.

Notice of opposition to a European Patent dated Jul. 9, 2020 for European Patent No. EP3331537.

Opposition Filing dated Jul. 9, 2020 for European Patent No. EP3331537.

Communication of Notice of Opposition dated Jul. 9, 2020 for European Patent No. EP3331537.

Closa-Monasterolo et al., "Safety and efficacy of inulin and oligofructose supplementation in infant formula: Results from a randomized clinical trial", Clinical Nutrition, 32, (2013) pp. 918-927.

Chinese Office Action mailed Nov. 20, 2019 for corresponding Chinese Application No. 2016800453456 and English translation.

Verghese M et al: "Inhibitory effects of nondigestible carbohydrates of different chain lengths on azoxymethane- induced aberrant crypt foci in Fisher 344 rats", Nutrition Research, Elsevier Inc, XX, vol. 25, No. 9, Sep. 1, 2005 (Sep. 1, 2005}, pp. 859-868, XP027795795.

Marcel Roberfroid: "Inulin-Type Fructans: Functional Food Ingredients 1,2", Inulin-Type Fructans, Oct. 28, 2004 (Oct. 28, 2004), pp. 2493-2502, XP055239136.

Lohner et al., "Prebiotics in healthy infants and children for prevention of acute infectious diseases; a systematic review and meta-analysis", Nutrition Reviews, Special Article, vol. 72, issue 8, 2014, 523-531 (Cited on p. 2 of the specification).

Chatchatee et al., "Effects of Growing-Up Milk Supplemented with Prebiotics and LCPUFAs on Infections in Young children", J Pediatr Gastroenterol Nutr., 58(4), 2014, 428-437 (Cited on p. 2 of the specification).

Arslanoglu et al., "Early Dietary Intervention with a Mixture of Prebiotic Oligosaccharides Reduces the Incidence of Allergic Manifestations and Infections during the First Two Years of Life", The Journal of Nutrition, 2008, 1091-1095 cited on p. 2 of the specification).

Lien et al., "Impact of milk consumption on performance and health of primary school children in rural Vietnam", Asia Pac J Clin Nutr, 18(3), 2009, 326-334 (Cited on p. 2 of the specification).

Perez et al., "Effect of probiotic supplementation on immunoglobulins, isoagglutinins and antibody response in children of low socio-economic status", Eur J Nutr, vol. 49, 2010, 173-179 (Cited on p. 2 of the specification).

Slavin et al., "The diagnosis and management of sinusitis: A practice parameter update", J Allergy Clin Immunol, vol. 116(6), Dec. 2005, S13-S47 (Cited on p. 4 of the specification).

Joye & Hoebregs, "Determination of Oligofructose, a Soluble Dietary Fiber, by High-Temperature Capillary Gas Chromatography", J. AOAC International, vol. 83, No. 4, 2000, pp. 1020 to 1025 (Cited on p. 8 of the specification).

* cited by examiner

PROPHYLACTIC USE OF INULIN AGAINST SINUSITIS

CROSS REFERENCE TO RELATED APPLICATIONS

The present application claims priority to U.S. patent application Ser. No. 15/737,776, filed Dec. 19, 2017, which claims priority to International Application No. PCT/EP2016/068441 filed Aug. 2, 2016, which claims priority to European Application No. 15179726.3 filed Aug. 4, 2015, the contents of which are all incorporated herein by reference.

DETAILED DESCRIPTION OF THE DRAWINGS

FIG. 1: The number of sinusitis episodes in children being subjected to a prophylactic treatment with the inulin composition of the present invention (termed 'prebiotic') and a placebo.

Figure 2:
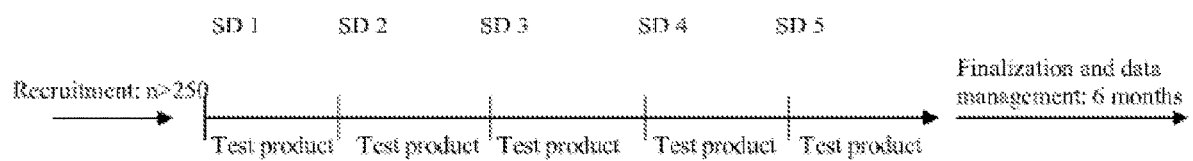

FIG. 2: The design of a double-blind, parallel, randomized and placebo controlled study on the effect of a prebiotic inulin composition in children of 3 to 6 years.

The present invention relates to an inulin composition comprising $GF_n$- and $F_m$-compounds, in particular for decreasing the risk of sinusitis, preferably for use in the prophylaxis of sinusitis in a subject in need thereof and food, beverages and pharmaceutical compositions containing the inulin composition.

The inflammation of the paranasal sinuses is commonly known as sinusitis or rhinosinusitis. Sinusitis commonly involves inflammation of the air cavities within the passages of the nose. It can be caused by viral or bacterial organism, allergy, particular irritation of the sinuses or autoimmune problems. Most cases are, however, due to viral infection. Generally, sinusitis is classified in various categories, namely acute sinusitis referring to new infections lasting up to four weeks, recurrent acute sinusitis involving four or more separate episodes of acute sinusitis occurring within one year, sub-acute sinusitis representing a transition between acute and chronic infections, chronic sinusitis showing signs and symptoms of sinusitis for more than 12 weeks and acute exacerbation of chronic rhinosinusitis showing signs and symptoms of chronic sinusitis exacerbate but returning back to baseline after treatment. The most common form of sinusitis is acute sinusitis caused by viral infections, in particular caused by rhinoviruses, coronaviruses and influenza viruses, but also by adenoviruses or other virus types. In fact, acute respiratory tract infections are the most common reason for people to seek medical help in developed countries.

Sinus infection symptoms usually include sinus headache, facial tenderness, pressure or pain in the sinuses, fever, cloudy, discolored drainage and sore throat and cough.

Sinus infection is generally diagnosed based on patient history and physical examination by a healthcare professional. Bacterial sinusitis is usually treated with an antibiotics therapy. In high-income countries, acute upper respiratory tract infections account for up to 75% of all antibiotic use. Viral sinusitis usually resolves without antibiotics and commonly involves the use of home remedies such as over-the-counter medications and an appropriate patient's behavior such as resting and drinking enough water. The incidence of viral respiratory tract infections in children is about 6 to 8 per year.

However, the development of effective preventive strategies is needed both globally and at the national level to reduce the incidence of acute respiratory infections, in particular also in children.

The prevention of sinusitis is known in the art and involves mainly behavioral instructions to subjects in danger of sinusitis. Thus, such subjects should avoid any contact with people who have colds and other viral upper respiratory infections, should avoid cigarettes, cigar and pipe smoke and treat stuffiness caused by colds or allergies promptly helping to prevent a bacterial infection from developing in the sinuses. Further, strategies to prevent acute infections include the administration of different immune-stimulants, vitamins, and trace elements; recently, probiotics also were described to be effective in reducing the incidence of upper respiratory tract infections and diarrhea.

With probiotic supplementation, a large number (billions) of living probiotic bacteria must be administered on a daily basis to ensure the continuous colonization of the intestine and achieve the desired health benefits.

Supplementation with prebiotics may be an alternative and easier way to achieve the same positive health effects usually ascribed to supplementation with probiotics. Prebiotics mimic the beneficial functional properties of human milk oligosaccharides (HMOs): they increase stool colony counts of bifidobacteria and lactobacilli (Lohner et al., Nutrition Reviews, Special Article, vol. 72, issue 8, 2014, 523-531).

As for the mechanism responsible for the beneficial role of prebiotics studies in infants have documented that prebiotic mixture supports immune development by significantly improving the intestinal microbiota. A healthy microbiota in turn is important for the development of the immune system (Chatchatee et al., J Pediatr Gastroenterol Nutr., 58(4), 2014, 428-437). Supplementation of 0-2 year old infants and children with prebiotics accordingly led to fewer upper respiratory tract infections (Arslanoglu et al., The Journal of Nutrition, 2008, 1091-1095).

Even though the intestinal microbiota can still be modified by prebiotic intake in children beyond the age of 2 (Lien et al., Asia Pac J Clin Nutr, 18(3), 2009, 326-334), no effects on upper respiratory tract infections or fever are obtained in older children (up to 10 years) (Perez et al., Eur J Nutr, vol. 49, 2010, 173-179).

As evident from the tremendous amount of sinusitis cases all over the world occurring each year and the above-identified efforts to prevent or treat sinusitis in patients of any age, it is apparent that the existing prophylactic means are not sufficient to prevent the occurrence of sinusitis, both in adults and children.

Thus, the technical problem underlying the present invention is to provide improved means for decreasing the risk of sinusitis in subjects in need thereof, in particular for use in the prophylaxis of sinusitis in subjects in need thereof.

A particular technical problem underlying the present invention is to provide improved means for decreasing the risk of sinusitis in subjects in need thereof, in particular for use in the prophylaxis of sinusitis in subjects in need thereof, wherein the subjects in need thereof are children, in particular at an age from three to six.

The technical problem underlying the present invention is solved by the teaching according to the claims, in particular by an inulin composition comprising $GF_n$- and $F_m$-compounds, which inulin composition comprises 25 to 40 wt.-% (dry substance, based on total mass of carbohydrates) of compounds having a DP (degree of polymerization)≥11, 15 to 30 wt.-% (dry substance, based on total mass of carbohydrates) of $F_m$ compounds with m=2 to 9, wherein the $DP_{AV}$ (number-average degree of polymerization) of the inulin composition is 6.5 to 9.

It was surprisingly found that such an inulin composition can be safely used for decreasing the risk of sinusitis in subjects in need thereof, particularly humans, preferably in children at an age from 3 to 6, thereby significantly reducing the occurrence of sinusitis. Thus, the present inulin composition is useful for the prophylactic treatment in humans.

In a particularly preferred embodiment, the subject in need for decreasing the risk of sinusitis or of a prophylaxis of sinusitis is a human at an age of at least 3 years, in particular a preschool human, in particular a human at an age from 3 to 6 years, preferably 3.5 to 6 years, preferably 4 to 6 years, preferably 5 to 6 years, preferably 5 to 5.5 years.

Thus, the present invention in particular relates to an inulin composition according to the present teaching which is for use in the prophylaxis of sinusitis in a subject in need thereof. In a preferred embodiment, the present invention relates to an inulin composition according to the present teaching which is for decreasing the risk of sinusitis in a subject in need thereof. In a preferred embodiment, the present invention relates to an inulin composition according to the present teaching which is for use in a method of decreasing the risk of sinusitis in a subject in need thereof.

The present invention provides the unexpected and advantageous teaching that the specific inulin composition of the present invention when used as an active ingredient in human beings, in particular human beings at an age of 3 to 6 years, significantly reduces the number of sinusitis cases compared to a placebo control group, preferably by at least 33%, particularly at least 35%, particularly at least 40%, particularly at least 45% and preferably at least 50%. Preferably, said significant reduction in comparison to a placebo control group is realized during an administration period of the present inulin composition of at least four weeks, preferably at least two months, preferably at least three months, preferably at least five months, preferably at least six months, preferably at least nine months and particularly at least one year. In a preferred embodiment, the placebo group is treated with maltodextrin as the placebo.

The inulin composition provided by the present invention not only significantly reduces the occurrence of sinusitis but also does not cause any significant gastrointestinal or other problems to the subject. In fact, the inulin composition of the present invention is safe and very well tolerated even after continuous administration for 6 months. It could preferably even be shown that the stool consistency was favorably modulated by the present mixture by making the stools softer within a healthy and normal range in the subjects investigated.

The present invention is, without being bound by theory, further surprising and advantageous insofar as it is known that the major period of maturation of the immune system in humans is the infantile age from birth to twelve months. Thus, the development of the immune system is regularly already completed at an age of at latest 3 years. However, the present composition is a preferred embodiment and is able to improve the performance of the immune system in children of an age from 3 to 6 years.

In the context of the present invention, the term 'inulin' refers to a polydisperse carbohydrate material comprising mainly fructose units connected by β(2-1)-fructosyl-fructose links. It is a white odorless soluble powder with a slightly sweet taste and no aftertaste.

In particular, inulin is a mixture of oligo- and polysaccharides which are composed of fructose (F) units and which oligo- and polysaccharides may or may not comprise a starting glucose moiety (G). Thus, in the context of the present invention, the term inulin refers to both $GF_n$- (which is Glucose-Fructosen or Glu-Fru$_m$) and $F_m$- (which is Fructose$_m$ or Fru$_m$) compounds, with n and m: number of fructose units in the oligo- or polysaccharide and each of n and m≥2.

In a particularly preferred embodiment of the present invention, the inulin composition of the present invention is prepared from inulin of plant origin, i.e. originating and prepared from a plant, preferably said plant inulin having a DP (degree of polymerization) of at maximum 200. In a preferred embodiment, the present inulin composition is prepared from chicory inulin, preferably from native chicory inulin, preferably said chicory inulin having a DP from 2 to 70, and/or said chicory inulin preferably containing no or negligible amounts of compounds $F_m$ with m≥10 (F10 and higher). However, an inulin composition prepared and originating from *Dahlia*, Jerusalem artichoke (*Helianthus tuberosus*), *Inula helenium* or other suitable plants is also envisaged.

In the context of the present invention, the term 'sinusitis' refers to acute sinusitis which is defined as inflammation of one or more of the paranasal sinuses and characterized by at least one of the following prominent symptoms and signs lasting for less than 4 weeks, namely nasal congestion, purulent rhinorrhea, facial-dental pain, postnasal drainage, headache, cough, sinus tenderness on palpation, mucosal erythema, purulent nasal secretion, increased pharyngeal secretion and periorbital edema (Slavin et al., J Allergy Clin Immunol, vol. 116(6), 2005, S13-S47).

In the context of the present invention, the term 'prophylaxis' refers to a treatment designed and used to prevent the disease, namely sinusitis, from occurring.

In a preferred embodiment of the present invention, the inulin composition according to the present teaching comprises 30 to 38 wt.-%, preferably 35 to 39 wt.-%, preferably 32 to 38 wt.-%. preferably 32 to 36 wt.-% (each based on dry matter and on total mass of carbohydrates) of compounds, preferably $GF_n$-compounds, having a DP≥11.

In a furthermore preferred embodiment of the present invention, the inulin composition according to the present teaching comprises 20 to 28 wt.-%, preferably 22 to 26 wt.-% (each based on dry matter and based on total mass of carbohydrates) of $F_m$-compounds with m=2 to 9.

In a furthermore preferred embodiment of the present invention, the inulin composition according to the present teaching has a $DP_{AV}$ from 7 to 8, preferably 7.5.

In a preferred embodiment of the present invention, the inulin composition comprises, preferably consists essentially of, preferably consists of, $GF_n$- and $F_m$-compounds. Preferably, the inulin composition of the present invention contains less than 1 wt.-% of $F_m$-compounds with m≥10 (DP≥10), preferably does not contain $F_m$-compounds with m≥10.

The inulin composition of the present invention preferably comprises 50 to 70 wt.-%, preferably 55 to 65 wt.-%, $GF_n$- and $F_m$-compounds with a DP 3 to 10. In a furthermore preferred embodiment of the present invention, the present inulin composition comprises 30 to 40 wt.-%, preferably 32 to 36 wt.-%, preferably 35 to 39 wt.-%, preferably 32 to 38 wt.-% $GF_n$-compounds with a DP≥11 (each based on dry matter and on the total mass of carbohydrates, preferably measured by HPAEC-high performance anion exchange chromatography). Preferably, the present inulin composition comprises 50 to 70 wt.-%, preferably 55 to 65 wt.-%, $GF_n$- and $F_m$-compounds with a DP 3 to 10 and 30 to 40 wt.-%, preferably 32 to 36 wt.-%, preferably 35 to 39 wt.-%, preferably 32 to 38 wt.-%, $GF_n$-compounds with a DP≥11 (each based on dry matter and on total mass of carbohydrates, preferably each measured by HPAEC).

In a preferred embodiment of the present invention, the inulin composition comprises, preferably essentially consists of, preferably consists of, 80 to 100%, preferably 80 to 99% a, preferably 82 to 98%, preferably 85 to 95%, preferably 87 to 92%, $GF_n$- and $F_m$-compounds, and 0 to 20%, preferably 1 to 20%, preferably 2 to 18%, preferably 5 to 15%, preferably 8 to 13%, monosaccharides and sucrose (each based on weight of dry matter and total mass of carbohydrates). Most preferably, the inulin composition comprises 86 to 89 wt.-% $GF_n$- and $F_m$-compounds and 11 to 14 wt.-% glucose, fructose and sucrose (each based on weight of dry matter and total mass of carbohydrates).

In the context of the present invention, a monosaccharide is preferably glucose, fructose or a mixture thereof.

In a preferred embodiment of the present invention, the present inulin composition does not contain galactose and/or oligosaccharides or polysaccharides, which oligo- or polysaccharides contain at least one galactose moiety.

In a preferred embodiment of the present invention, the inulin composition of the present invention comprises at least 80%, preferably at least 85%, preferably at least 86%, preferably at least 90%, $GF_n$- and $F_m$-compounds and the remainder adding up to 100% with sucrose and/or monosaccharides, preferably glucose, fructose, sucrose or a mixture thereof (each based on weight of dry matter and total mass of carbohydrates).

In one preferred embodiment of the present invention, the present inulin composition is free of sucrose and/or monosaccharides, preferably free of glucose, fructose, sucrose or a mixture thereof.

In a furthermore preferred embodiment of the present invention, the present inulin composition is adapted and suitable for use in a dosage from 2.5 to 15 g/day, in particular 3.0 to 14 g/day, in particular 7 to 12 g/day, in particular 5 to 10 g/day, preferably 8 to 10 g/day, preferably 5 to 7 g/day, preferably 6 g/day, in particular for children.

In a furthermore preferred embodiment, the present inulin composition is adapted and suitable for use in a dosage form from 5.0 to 15 g/day, in particular 7 to 12 g/day, in particular 8 to 10 g/day, in particular for adults. Preferably, a dosage from 5 to 7 g/day, in particular 6 g/day, is provided for adults.

The present inulin composition may be in solid, for instance dry, semi-solid or liquid form, for instance in form of an aqueous solution or suspension.

In a preferred embodiment of the present invention, the present inulin composition is for use over an administration period from 1 month to a lifetime administration, in particular from 2 months to 2 years, preferably from 3 months to 12 months, preferably from 1 month to 8 months, preferably 4 months to 8 months, most preferably for at least 6 months or for 6 months.

According to a preferred embodiment of the present invention, the inulin composition can be used in form of a pharmaceutical composition, preferably in a dosage unit form, for instance in form of a tablet, pill, agglomerate or powder.

The present inulin composition may also be used as an ingredient of a nutrition, for instance daily nutrition.

In a preferred embodiment, the present inulin composition is used as an ingredient of food, beverage or a pharmaceutical composition.

The present invention, thus, also provides a nutritional composition, preferably food or beverage, and a pharmaceutical composition each comprising, preferably consisting essentially of, the inulin composition of the present invention, preferably together with at least one additive. In a particularly preferred embodiment of the present invention, the nutritional composition, preferably food or beverage or the pharmaceutical composition, is in solid, semi-solid or liquid form.

In a preferred embodiment, the nutritional composition is for decreasing the risk of sinusitis in a subject in need thereof, preferably is for use in the prophylaxis of sinusitis in a subject in need thereof. In a furthermore preferred embodiment, the pharmaceutical composition of the present invention is for decreasing the risk of sinusitis in a subject in need thereof, preferably for use in the prophylaxis of sinusitis in a subject in need thereof.

In a particularly preferred embodiment of the present invention, the present inulin composition is orally administered to the subject in need thereof, in particular in form of a nutritional composition, preferably food or beverage or as a pharmaceutical composition.

In a particularly preferred embodiment of the present invention, the nutritional composition, preferably food or beverage, or the pharmaceutical composition comprises 1 to 99%, preferably 5 to 95%, preferably 10 to 90%, preferably 20 to 80%, preferably 30 to 70%, preferably 40 to 60%, preferably 50 to 90%, preferably 75 to 99%, preferably 60 to 95%, preferably 70 to 98%, of the present inulin composition and at least one additive in an amount adding up to 100% (% each in wt.-% based on overall weight of the composition). Such an additive may be a long-chain polyunsaturated fatty acid, a probiotic microorganism, a vitamin, a mineral, a sweetening agent such as a sugar substitute, high intensity sweetener or sugar, a binder, filler, lubricant, diluent, solvent, coloring agent, flavoring agent or plant extract.

In a preferred embodiment of the present invention, a method is provided to prophylactically treat a subject, in particular a human, in particular a human at an age of at least 3 years, preferably at an age from 3 to 6 years, so as to reduce the risk of sinusitis, in particular the occurrence of sinusitis, with the inulin composition of the present invention.

In the context of the present invention, the term 'comprising' preferably has the meaning of 'containing' or 'including', meaning that the composition in question at least comprises the specifically identified component without excluding the presence of further components. However, in a preferred embodiment, the term 'comprising' is also understood to have the meaning of 'consisting essentially of' and in a most preferred embodiment of 'consisting'. The term 'consisting essentially of' excludes the presence of substantial amounts of further components except the specifically identified component of the composition. The term 'consisting' excludes the presence of any further compound, no matter in which quantity, in the composition identified.

In the context of the present invention, the term 'comprising essentially' preferably has the meaning that the specifically identified component is the component with the highest proportion in the composition in question compared to the other components present. However, in a preferred embodiment, the term 'comprising essentially' means that the composition in question comprises at least 50 wt.-%, even more preferably at least 51 wt.-%, preferably at least 60 wt.-%, most preferably at least 70 wt.-%, most preferably at least 80 wt.-%, most preferably at least 90 wt.-%, most preferably at least 95 wt.-%, most preferably at least 98 wt.-%, most preferably at least 99 wt.-%, of the specifically identified component.

If not outlined otherwise, percentage values given in the present description mean weight percent based on dry matter.

Section A: Determination of Weight Percentages

In the context of the present invention, the weight-% in dry matter of compounds having a DP≥11 based on the total mass of carbohydrates is determined by measuring the total amount of dry carbohydrates and the total amount of dry compounds having a DP up to and including 10 via high-temperature capillary gas chromatography (HGC) as disclosed in Joye & Hoebregs, J. AOAC International, vol. 83, no. 4, 2000, pages 1020 to 1025 and calculating from said measurements the weight-% of the sum of compounds having a DP≥11 and above.

In the context of the present invention, the weight-% in dry matter of $F_m$-compounds with m=2 to 9 based on the total mass of carbohydrates is determined by measuring the total amount of dry carbohydrates and the total amount of dry $F_m$-compounds with m=2 to 9 via high-temperature capillary gas chromatography (HGC) as disclosed in Joye & Hoebregs, J. AOAC International, vol. 83, no. 4, 2000, pages 1020 to 1025. Thus, $F_m$-compounds with m=2 to 9 include compounds F2, F3, F4, F5, F6, F7, F8 and F9, but e.g. no GF-compounds such as $GF_2$, (kestose) $GF_3$, and so on.

Section B: Determination of DP Values:

In the context of the present invention, the term 'DP' (degree of polymerization) represents the inulin chain length expressed in number of glucose and fructose units present in the inulin molecule, i.e. the oligo- or polysaccharide.

In the context of the present invention, the number-average degree of polymerization ($DP_{AV}$) represents the average inulin chain length.

In the context of the present invention, the $DP_{AV}$ for the present inulin composition comprising $GF_n$- and Fm-compounds is calculated as follows.

The determination of the average degree of polymerization $DP_{AV}$, i.e. the number-average degree of polymerization, in compositions consisting of $GF_n$-compounds according to AOAC Official Method 997.08 (2013 version, AOAC International) requires first the determination of free glucose and fructose concentrations, as well as the concentrations of glucose and fructose deriving from sucrose, starch and/or maltodextrines present in the inulin composition to be analyzed in order to determine then the amounts of inulin-related fructose (which is fructose bound in an $GF_n$-inulin molecule) ($F_i$) and inulin-related glucose (which is glucose bound in an $GF_n$-inulin molecule) ($G_i$) both of these amounts being measured after inulinase treatments, i.e. complete enzymatic hydrolysis of the inulin composition to be analyzed. Thus, subtracting the concentrations of glucose and fructose being either present in free form or in form of sucrose, starch and/or maltodextrines from the overall fructose and glucose content determined after complete hydrolysis of the inulin composition to be analyzed provides the concentrations, in particular weight-percentages, of $F_i$ and $G_i$.

In addition to the above-identified glucose and fructose in free form and deriving from sucrose, maltodextrines and/or starch, the present inulin composition comprising $GF_n$- and $F_m$-compounds, however, contains significant amounts of oligo- and polyfructose ($F_m$-compounds) leading after complete enzymatic hydrolysis to fructose molecules, as well. The amount of fructose from said $F_m$-compounds, therefore, has to be also subtracted from $F_i$ in order to obtain the desired and thereby corrected $GF_n$-inulin-related fructose content.

In the context of the present invention, weight-percentages of $F_i$ and $G_i$ are determined via the above-identified method AOAC 997.08 (version 2013). In the context of the present invention, weight-percentages of compounds F2, F3, F4, F5, F6, F7, F8 and F9 are determined via high-temperature capillary gas chromatography (HGC) as disclosed in Joye & Hoebregs, J. AOAC International, vol. 83, no. 4, 2000, pages 1020 to 1025.

In the context of the present invention, the $DP_{AV}$ for an inulin composition according to the present invention is calculated by correcting the weight-% values obtained by using the AOAC 997.08 method (2013 version) for $F_i$ and $G_i$ by the weight-% values obtained from using HGC for the determination of the amount of F2 to F9 compounds.

Accordingly, the $DP_{AV}$ of the inulin composition according to the present invention is calculated as follows:

[$F_i$ according to AOAC] minus [sum of $F_m$ compounds according to HGC] yields [$F_i$ attributable to $GF_n$].

[$F_i$ attributable to $GF_n$] divided by [$G_i$]+1.

yields the DPav for the $GF_n$ portion of the present composition.

The determination of the amount of the individual $F_m$ compounds via HGC allows direct calculation of the DPav for the $F_m$ portion of the present composition.

The two DPav numbers are combined to yield an overall DPav of the mixture.

Further preferred embodiments of the present invention are the subject-matter of the subclaims.

The present invention will now be further illustrated by way of a non-limiting example and the accompanying figures.

FIG. 1 shows:
the number of sinusitis episodes (y-axis) in children being subjected to a prophylactic treatment with the inulin composition of the present invention (termed 'prebiotic' A) and a placebo B.

EXAMPLE

A) A double-blind, parallel, randomized and placebo controlled study on the effect of a prebiotic inulin composition according to the invention was conducted in children of 3 to 6 years. The study was conducted at the Nutritional Research Unit, investigated whether an administration of said mixture helps to reduce the risk of sinusitis episodes. The children took part in this study with the consent and permission of their parents.

From a group of 270 randomized children 258 started the study while 219 completed it with a group of 39 children which has dropped out. The children were healthy children of 3 to 6 years of age and were attending daycare centers.

The children were allocated to two different groups, wherein the first group (130 subjects) was subjected to a six-month administration of 6 g/day of the inulin composition of the present invention and the second group (128 subjects) (placebo group) was subjected to a six-month administration of 6 g/day of maltodextrin. The data were collected on five different study days (SD1 to SD5).

The prebiotic inulin composition and placebo were mixed into food and drinks consumed at a fixed time point each day (e.g. for breakfast or dinner).

The study design is depicted in FIG. 2.

To detect differences between the two supplemented groups the following statistical tests were used:
Shapiro-Wilk test for normal distribution,
Mann-Whitney test for quantitative variables, anthropometric measurements and incidence and duration of infectious diseases,
Pearson Chi-square test for variables expressed as percentages and for comparison of the proportion of children with specific acute disease incidences and antibiotic prescription rates.

Statistical tests were performed two-sided. A p-value of less than 5% was considered as statistically significant.

The data as presented herein were obtained on 5 different study days (SD 1-5) as evident from FIG. 2.

B) The prebiotic inulin composition as used in the study had 27 wt. % of compounds having DP≥11, 26 wt. % of $F_m$ compounds (with m being 2 to 9), and a DPav of 7.5. These characteristics were determined as described above in sections A and B. The prebiotic inulin composition was prepared by mixing 93% highly soluble inulin (Orafti® HSI, supplier: BENEO) with 7% long-chain inulin (Orafti® HP, supplier: BENEO).

C) FIG. 1 compares the prevalence of sinusitis episodes in the group of children having obtained the present inulin composition and the placebo group. Accordingly, there is a significant reduction in the sinusitis prevalence by 77% in the groups of children having obtained the inulin composition of the present invention. The present study, therefore, shows that the number of sinusitis episodes (FIG. 1) could drastically be reduced by intake of the inulin composition of the present invention.

The present study conducted in 3 to 6-year-old children, thus, shows the modulation of the health status of children with respect to the reduction of sinusitis even though the development of the immune system should have been almost completed at said age. The major period of maturation of the immune system is the infantile age, namely 0 to 12 months. Hence, the prebiotic inulin composition of the present invention is able to improve the performance of the immune system in children of preschool age, which is a novel and advantageous finding. The present study is the first study showing a significant reduction of sinusitis episodes in children, in particular aged 3 to 6 years.

Summing up, the present study shows that the present inulin composition is effective in the modulation of sinusitis over a vulnerable seasonal period in highly exposed study population, namely children attending daycare facilities aged 3 to 6 years.

The invention claimed is:

1. A method for decreasing the risk of sinusitis in a subject that is a child three to six years of age, attending a daycare facility, and is at risk of developing sinusitis, comprising administering to the subject an inulin composition,
    wherein 25 to 40 wt.-% (dry matter, based on total mass) of the inulin composition is $GF_n$-(GlucoseFructose$_n$-) and $F_m$-(Fructose$_m$-) compounds having a DP≥11 (degree of polymerization), and 15 to 30 wt.-% (dry matter, based on total mass) of the inulin composition is Fm compounds with m=2 to 9,
    wherein the $DP_{AV}$ (average degree of polymerization) of the inulin composition is 6.5 to 9 and
    wherein the inulin composition is administered at a daily dose of from 5 to 15 (dry matter) grams for 1 to 8 months wherein administration of the composition decreases the risk of sinusitis by at least 75%.

2. The method according to claim 1, wherein 30 to 38 wt.-% (dry matter, based on total mass) of the inulin composition is $GF_n$- and $F_m$-compounds having a DP≥11.

3. The method according to claim 1, wherein 20 to 28 wt.-% (dry matter, based on total mass) of the inulin composition is Fm compounds having an m=2 to 9.

4. The method according to claim 1, wherein the $DP_{AV}$ of the inulin composition is 7 to 8.

5. The method according to claim 1, wherein 50 to 70 wt.-% of the inulin composition is $GF_n$- and $F_m$-compounds having a DP of 3 to 10 and 30 to 40 wt.-% of the inulin composition is $GF_n$ compounds having a DP≥11 (each based on dry matter and on total mass).

6. The method according to claim 5, wherein 55 to 65 wt.-% of the inulin composition is $GF_n$- and Fm compounds having a DP of 3 to 10 and 35 to 39 wt.-% of the inulin composition is $GF_n$ compounds having a DP≥11 (each based on dry matter and on total mass).

7. The method according to claim 1, wherein 80 to 99 wt.-% of the inulin composition is $GF_n$- and $F_m$-compounds and 1 to 20 wt.-% of the inulin composition is monosaccharides and sucrose (each based on weight of dry matter and total mass).

8. The method according to claim 1, wherein the inulin composition is administered to a subject in need thereof in the form of a food, beverage or pharmaceutical composition.

9. A method for prophylactically treating sinusitis in a subject that is a child three to six years of age, attending a daycare facility, and is at risk of developing sinusitis, comprising administering to the subject an inulin composition, wherein 25 to 40 wt.-% (dry matter, based on total mass) of the inulin composition is $GF_n$-(GlucoseFructose$_n$-) and $F_m$-(Fructose$_m$-) compounds having a DP≥11 (degree of polymerization), and 15 to 30 wt.-% (dry matter, based on total mass) of the inulin composition is $F_m$ compounds with m=2 to 9,
    wherein the $DP_{AV}$ (average degree of polymerization) of the inulin composition is 6.5 to 9 and
    wherein the inulin composition is administered at a daily dose of from 5 to 15 (dry matter) grams for 1 to 8 months wherein administration of the composition decreases the risk of sinusitis by at least 75%.

10. The method according to claim 1, wherein the $DP_{AV}$ (average degree of polymerization) of the inulin composition is about 7.5.

11. The method according to claim 9, wherein the $DP_{AV}$ (average degree of polymerization) of the inulin composition is about 7.5.

* * * * *